United States Patent
Chen

(10) Patent No.: US 10,983,606 B2
(45) Date of Patent: Apr. 20, 2021

(54) CONTROL INSTRUCTION INPUT METHODS AND CONTROL INSTRUCTION INPUT DEVICES

(71) Applicant: Yungu (Gu'an) Technology Co., Ltd., Langfang (CN)

(72) Inventor: Lan Chen, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/505,971

(22) Filed: Jul. 9, 2019

(65) Prior Publication Data
US 2019/0332193 A1    Oct. 31, 2019

Related U.S. Application Data

(63) Continuation of application No. PCT/CN2018/103212, filed on Aug. 30, 2018.

(30) Foreign Application Priority Data

May 28, 2018 (CN) .......................... 201810523767.0

(51) Int. Cl.
*G06F 3/0346* (2013.01)
*G06F 3/0485* (2013.01)

(52) U.S. Cl.
CPC .......... *G06F 3/0346* (2013.01); *G06F 3/0485* (2013.01)

(58) Field of Classification Search
CPC .... A61H 1/0262; G06Q 30/02; G06F 3/0346; G06F 3/0348
See application file for complete search history.

(56) References Cited

U.S. PATENT DOCUMENTS

7,881,824 B2 *  2/2011  Nagasaka .............. B25J 13/085
                                                  700/245
8,576,073 B2 * 11/2013  Mooring ................ G06F 3/017
                                                  340/407.1
(Continued)

FOREIGN PATENT DOCUMENTS

CN    101311882 A    11/2008
CN    102246125 A    11/2011
(Continued)

OTHER PUBLICATIONS

Taiwan office action for application 107132770 dated Sep. 3, 2020.

*Primary Examiner* — Cao H Nguyen
(74) *Attorney, Agent, or Firm* — Rimon PC

(57) ABSTRACT

A control instruction input method includes forming motion state information of a screen according to a limb movement; and forming an operating instruction of a UI in the screen according to the motion state information. An association between a limb stable posture and a touch standard instruction is established by recognizing the limb stable posture of wearing the smart wearable device. Therefore, the touch gesture input by the touch standard instruction is evolved into the limb motion posture. A cooperation process of both hands is avoided to make application scenarios of wearing the smart wearable device richer. At the same time, a motion process of the existing touch gesture is amplified by the relative large-scale motion state of the limb stable posture to form a finer instruction control process.

14 Claims, 3 Drawing Sheets

(56) References Cited

U.S. PATENT DOCUMENTS

| | | | |
|---|---|---|---|
| 9,939,910 B2* | 4/2018 | Shah | G06F 3/017 |
| 10,327,939 B2* | 6/2019 | House | A61F 5/0102 |
| 10,406,059 B2* | 9/2019 | Agrawal | A61H 1/0262 |
| 2014/0139454 A1* | 5/2014 | Mistry | G06F 1/163 |
| | | | 345/173 |
| 2016/0267310 A1* | 9/2016 | AlNasser | G06F 1/1686 |
| 2017/0035327 A1* | 2/2017 | Yuen | A61B 5/7264 |
| 2017/0038839 A1* | 2/2017 | Seth | G06F 3/017 |
| 2017/0177091 A1 | 6/2017 | Shah et al. | |

FOREIGN PATENT DOCUMENTS

| | | |
|---|---|---|
| CN | 102915184 A | 2/2013 |
| CN | 104111732 A | 10/2014 |
| CN | 104699390 A | 6/2015 |
| CN | 104714631 A | 6/2015 |
| CN | 105242780 A | 1/2016 |
| CN | 105487707 A | 4/2016 |
| CN | 106125910 A | 11/2016 |
| CN | 106445299 A | 2/2017 |
| CN | 106557021 A | 4/2017 |
| CN | 106775307 A | 5/2017 |
| CN | 106959769 A | 7/2017 |
| CN | 107850938 A | 3/2018 |
| KR | 20100000479 A | 1/2010 |
| TW | 201044219 A | 12/2010 |
| TW | 201606635 A | 2/2016 |
| WO | 2018045569 A | 3/2018 |

* cited by examiner

CONTROL INSTRUCTION INPUT METHODS AND CONTROL INSTRUCTION INPUT DEVICES

CROSS-REFERENCE TO RELATED APPLICATIONS

The present application is a continuation of International Application No. PCT/CN2018/103212 filed on Aug. 30, 2018, which claims priority to Chinese patent application No. 201810523767.0, filed on May 28, 2018. Both applications are incorporated herein by reference in their entireties.

TECHNICAL FIELD

The present application relates to the human-computer interaction technology, and in particular to a control instruction input method and a control instruction input device.

BACKGROUND

For a smart wearable device, there is usually a screen for human-computer interaction so as to display User Interface (UI). A control instruction may be input by a touch gesture. However, in some application scenarios, such as riding, one-handed load or wearing gloves outdoors, even for physically handicapped people, touch input is very inconvenient. A new technical solution is needed to overcome the obstacle of one-handed input.

SUMMARY

In view of this, embodiments of the present application provide a control instruction input method and a control instruction input device to solve a technical problem that a smart wearable device lacks an input path for one-hand input in the prior art.

The control instruction input method according to an exemplary embodiment of the present application includes: forming motion state information of a screen according to a limb movement; and forming an operating instruction of a UI in the screen according to the motion state information.

In an embodiment of the present application, the forming motion state information of a screen according to a limb movement includes: acquiring motion posture data of the screen according to a sensor signal, acquiring a time interval and rotation data of the screen in a stable posture according to rotation data of the screen, and determining a rotation state of the screen in the stable posture according to the time interval and the rotation data in the stable posture.

In an embodiment of the present application, the motion state includes: one or a combination of a forward smooth rotation, a forward acceleration rotation, a reverse smooth rotation and a reverse acceleration rotation.

In an embodiment of the present application, a mapping instruction of the forward smooth rotation including one of scrolling the UI in a forward direction, scrolling a focus content in the UI in the forward direction and moving a focus in the UI in the forward direction.

In an embodiment of the present application, a mapping instruction of the forward acceleration rotation includes either of switching to a previous UI and scanning the UI in a forward direction.

In an embodiment of the present application, a mapping instruction of the reverse smooth rotation includes one of scrolling the UI in a reverse direction, scrolling a focus content in the UI in the reverse direction and moving a focus in the UI in the reverse direction.

In an embodiment of the present application, a mapping instruction of the reverse acceleration rotation includes either of switching to a next UI and scanning the UI in a reverse direction.

In an embodiment of the present application, the forming an operating instruction of a UI in the screen according to the motion state information includes: obtaining the motion state information of the screen within a preset time interval, judging whether the screen is in a rotational motion or a reciprocating motion according to the motion state information, and forming an operating instruction of the rotational motion of the UI, when a motion characteristic of the screen refers to the rotational motion.

In an embodiment of the present application, the forming an operating instruction of the rotational motion of the UI, when a motion characteristic of the screen is a rotational motion includes: further determining a rotation direction, further determining whether a rotation speed reaches a first predetermined value, when the rotation direction is a first rotation direction, forming a scroll instruction to a first direction in the current UI, when the rotation speed does not reach the first predetermined value, and forming a switching instruction of the current UI to a previous UI, when the rotation speed reaches the first predetermined value, determining whether the rotation speed reaches a second predetermined value, when the rotation direction is a second rotation direction, forming a scroll instruction to a second direction in the current UI, when the rotation speed does not reach the second predetermined value, and forming a switching instruction of the current UI to a next UI, when the rotation speed reaches the second predetermined value.

In an embodiment of the present application, the forming motion state information of a screen according to a limb movement includes: acquiring motion posture information of the screen according to a sensor signal, acquiring a time interval and real-time movement data in the time interval according to a rotation data of the screen when the screen is in a stable posture, and determining the movement state of the screen in the stable posture according to the time interval and the movement data.

In an embodiment of the present application, the motion state includes at least one of a fast drop-return and a fast repeat fast drop-return.

In an embodiment of the present application, the forming an operating instruction of a UI in the screen according to the motion state information includes: a mapping instruction of the fast drop-return including single click, and a mapping instruction of the fast repeat fast drop-return including either of double clicks and consecutive clicks.

In an exemplary embodiment of the present application, the forming an operating instruction of a UI in the screen according to the motion state information includes: obtaining motion state information of the screen within a time interval, judging whether the motion state is a rotational motion or a reciprocating motion, and forming a click instruction in the current UI when the motion state is the reciprocating motion.

In an exemplary embodiment of the present application, one of a limb, an elbow and a waist loading the screen is act as a reference point of the motion state in the limb movement.

The control instruction input device according to an exemplary embodiment of the present application includes: a memory configured to store a program code corresponding to a processing procedure of the control instruction input method according to any one of the above embodiments, and a processor configured to execute the program code.

The control instruction input device according to an exemplary embodiment of the present application includes: a status confirmation module configured to form motion state information of a screen according to a limb movement, and an instruction mapping module configured to form an operating instruction of a UI in the screen according to the motion state information.

In the control instruction input method and the control instruction input device according to the embodiments of the present application, an association between a limb stable posture and a touch standard instruction is established by recognizing the limb stable posture of wearing the smart wearable device. Therefore, the touch gesture input by the touch standard instruction is evolved into the limb motion posture. A cooperation process of both hands is avoided to make application scenarios of wearing the smart wearable device richer. At the same time, a motion process of the existing touch gesture is amplified by the relative large-scale motion state of the limb stable posture to form a finer instruction control process.

DETAILED DESCRIPTION

Technical solutions in the embodiments of the present application are clearly and completely described in the following with reference to the accompanying drawings in the embodiments of the present application. It is obvious that the described embodiments are only a part of the embodiments of the present application, and not all embodiments. Based on the embodiments of the present application, all other embodiments obtained by those skilled in the art without creative efforts are within the scope of the present application.

Those skilled in the art may understand that a gyroscope, an accelerometer or a gravity sensor as well as other magnetic field sensors may be integrated in a smart wearable device. Basic posture data of the smart wearable device may be obtained according to each degree of freedom quantized signals collected by the gyroscope. Motion state data of the smart wearable device, such as a moving trajectory, an acceleration, a pointing direction or a gravity direction, may be further quantified accurately by combining each degree of freedom quantized signals with quantized signals collected by the other sensors.

Figure 1:
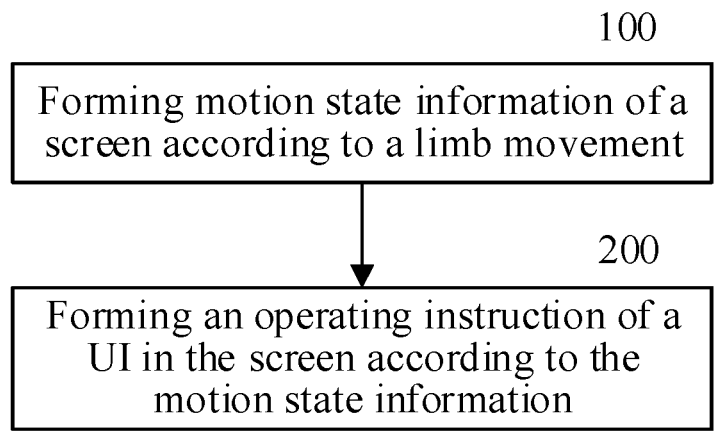
FIG. 1 is a flow chart of a control instruction input method according to an exemplary embodiment of the present application.

FIG. 1 is a flow chart of a control instruction input method according to an exemplary embodiment of the present application. As shown in FIG. 1, the control instruction input method includes the following steps.

Step 100: forming motion state information of a screen according to a limb movement.

The limb movement is formed by the coordinated limb movement of wearing part. A motion posture of the screen may be formed by the limb movement, and the motion posture includes a stable posture to maintain the screen in a stable posture.

The stable posture of the screen may include the following contents.

Keeping the screen at a stable angle that is conducive for wearer's sight observation.

Keeping the screen at a horizontal surface that is favorable for the wearer's sight observation.

Keeping the screen in a visual drop that is beneficial for the wearer's sight observation. The visual drop refers to a difference in height between the screen and the eyes.

Moving the screen uniformly or acceleratedly along an arc track in a direction, such as the arc track centered on the elbow.

Rotating the screen circumferentially at a small angle along an arc track having a length of a combined radius. For example, the arc track with the waist as a center, and a spacing of the shoulder, the upper arm and the lower arm as the combined radius.

Moving the screen to form a short distance rapid drop in a vertical direction. The rapid drop represents a difference of motion speed in a certain distance of the screen.

Forming the short distance rapid drop in the vertical direction while maintaining the screen at the horizontal surface.

Each above-mentioned screen stable posture may refer to an independent posture or a partial main posture of a complex motion posture. The above-mentioned motion stable may include a rotation state and a displacement state in the above-mentioned screen stable postures. Those skilled in the art can appreciate that the screen stable posture signals collected by the gyroscope and other sensors may be embodied as rotation state data and displacement state data of a corresponding degree of freedom in space. That is, a posture feature may be reflected by the rotation state data and the displacement state data of each screen stable posture.

Step 200: forming an operating instruction of a UI in the screen according to the motion state information.

Those skilled in the art can appreciate that by integrating the rotational state data and the displacement state data on a time axis, a limb motion process describing the above-mentioned screen stable posture may be substantially restored in a mathematical way. By associating the specific screen stable posture recognized by a judgment with the specified touch gesture, the screen stable posture during the limb motion process may be input as the operating instruction of the UI in the screen. Thereby, human-computer interaction is realized.

In the control instruction input method according to the embodiments of the present application, an association between a limb stable posture and a touch standard instruction is established by recognizing the limb stable posture of wearing the smart wearable device. Therefore, the touch gesture input by the touch standard instruction is evolved into the limb motion posture. A cooperation process of both hands is avoided to make application scenarios of wearing the smart wearable device richer. At the same time, an motion process of the existing touch gesture is amplified by the relative large-scale motion state of the limb stable posture to form a finer instruction control process.

Figure 2:
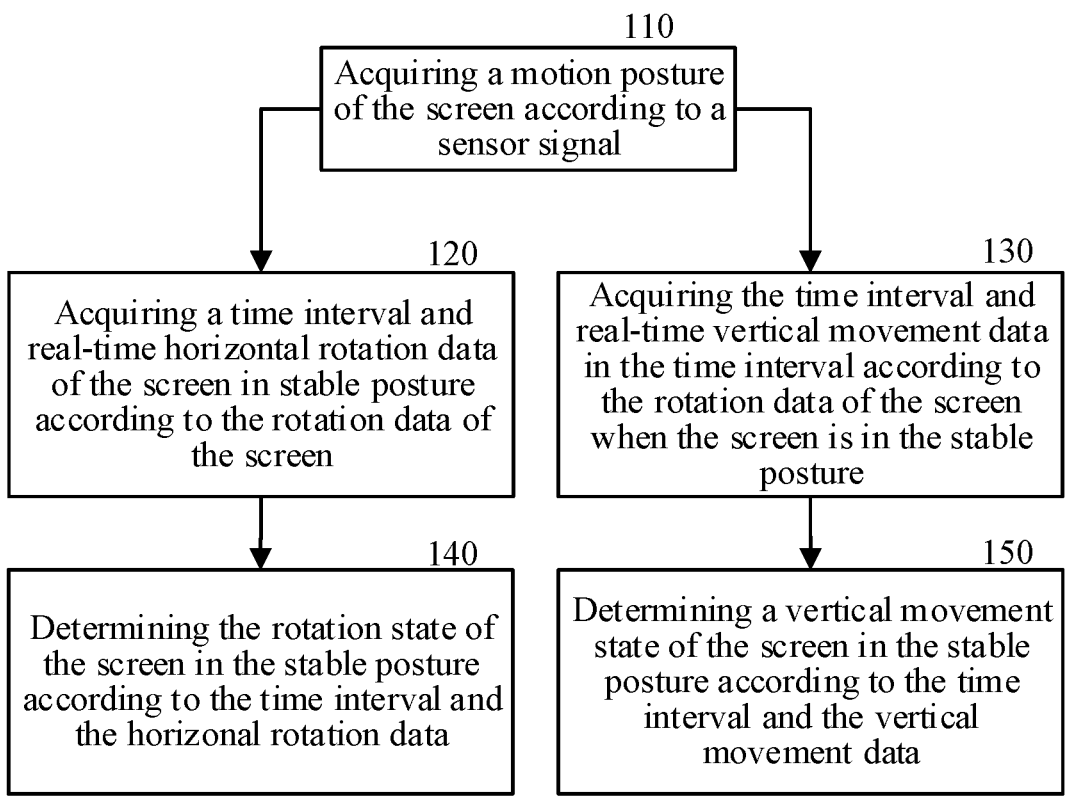
FIG. 2 is a flow chart of acquiring a rotational state and a displacement state in a control instruction input method according to an exemplary embodiment of the present application.

FIG. 2 is a flow chart of acquiring a rotational state and a displacement state in a control instruction input method according to an exemplary embodiment of the present application. As shown in FIG. 2, the step 100 includes the following steps.

Step 110: acquiring a motion posture of the screen according to a sensor signal.

By simply analyzing the signal collected by a sensor, a motion state of the smart wearable device may be obtained. The motion state includes a motion trajectory and body posture data of the smart wearable device. According to a combination of an initial value of the sensor, an initial association structure between the screen and the sensor and the body posture data of the smart wearable device, the motion posture of the screen may be obtained.

Step 120: acquiring a time interval and real-time horizontal rotation data of the screen in stable posture according to the rotation data of the screen.

The real-time rotation data refers to data that is conducive to observe the screen posture and be obtained by filtering the real-time data of the screen motion posture. A stable posture duration and the rotation data corresponding to the stable posture duration of the screen in an angle conductive to visual attention are obtained according to the real-time rotation data. At one visual attention angle, the screen is at a horizontal surface or is slightly off the horizontal surface.

Step 140: determining the rotation state of the screen in the stable posture according to the time interval and the rotation data.

The data acquired when the screen is in the stable posture is counted and quantified into a horizontal motion state having various features. The horizontal rotation state may include a forward smooth rotation, a forward acceleration rotation, a reverse smooth rotation, a reverse acceleration rotation, a forward acceleration rotation followed by a reverse smooth rotation, a reverse acceleration rotation followed by a forward smooth rotation and so on. In addition, the horizontal rotation state may also include trend quantitative data for forming the horizontal rotation state, such as a rotation direction, a rotation speed and the like. It may be understood by those skilled in the art that each smooth rotation refers to a rotation having a substantially close velocity and a definite direction, and each acceleration rotation refers to a rotation having a rate acceleration tendency and a definite direction.

Step 130: acquiring the time interval and real-time vertical movement data in the time interval according to the rotation data of the screen when the screen is in the stable posture.

The stable posture duration and a screen drop data corresponding to the stable posture duration of the screen in an angle conductive to visual attention are obtained according to the real-time horizontal rotation data. At one visual attention angle, the screen is at the horizontal surface or is slightly off the horizontal surface.

Step 150: determining a vertical movement state of the screen in the stable posture according to the time interval and the vertical movement data.

The data acquired when the screen is in the stable posture is counted and quantified into a displacement motion state having various features. The vertical movement state may include a fast drop-return, a fast repeat fast drop-return and so on. In addition, the vertical movement state may also include trend quantitative data for forming the vertical movement state, such as a movement direction, a movement speed, the number of drop-return and the like.

In the control instruction input method according to the embodiments of the present application, the screen state is determined by the sensor signal, and the duration and the motion data corresponding to the duration of the screen in the stable posture are determined by the screen state, and then main motion states of the screen is formed according to a quantitative statistical analysis of the motion data.

Therefore, a number of standard motion process of the wearer's limb movement are formed, so that the stable posture of the wearer's limb movement may be used as a association basis with a standard touch gesture or a standard input instruction. Thereby, a control input for interacting with the UI screen is formed according to a specific limb movement.

In a control instruction input method according to an exemplary embodiment of the present application, the judgment of the motion state in the flow of forming the operating instruction mainly includes:

obtaining the motion state information of the screen within a preset time interval;

judging whether the motion state is a rotational motion or a reciprocating motion;

forming the operating instruction of the UI according to a motion feature of the rotational motion.

forming the operating instruction of the UI according to a motion feature of the reciprocating motion.

The motion features of the rotational motion and the reciprocating motion include a movement direction, a movement average speed, a movement instantaneous speed, a movement peak speed and so on.

Figure 3:
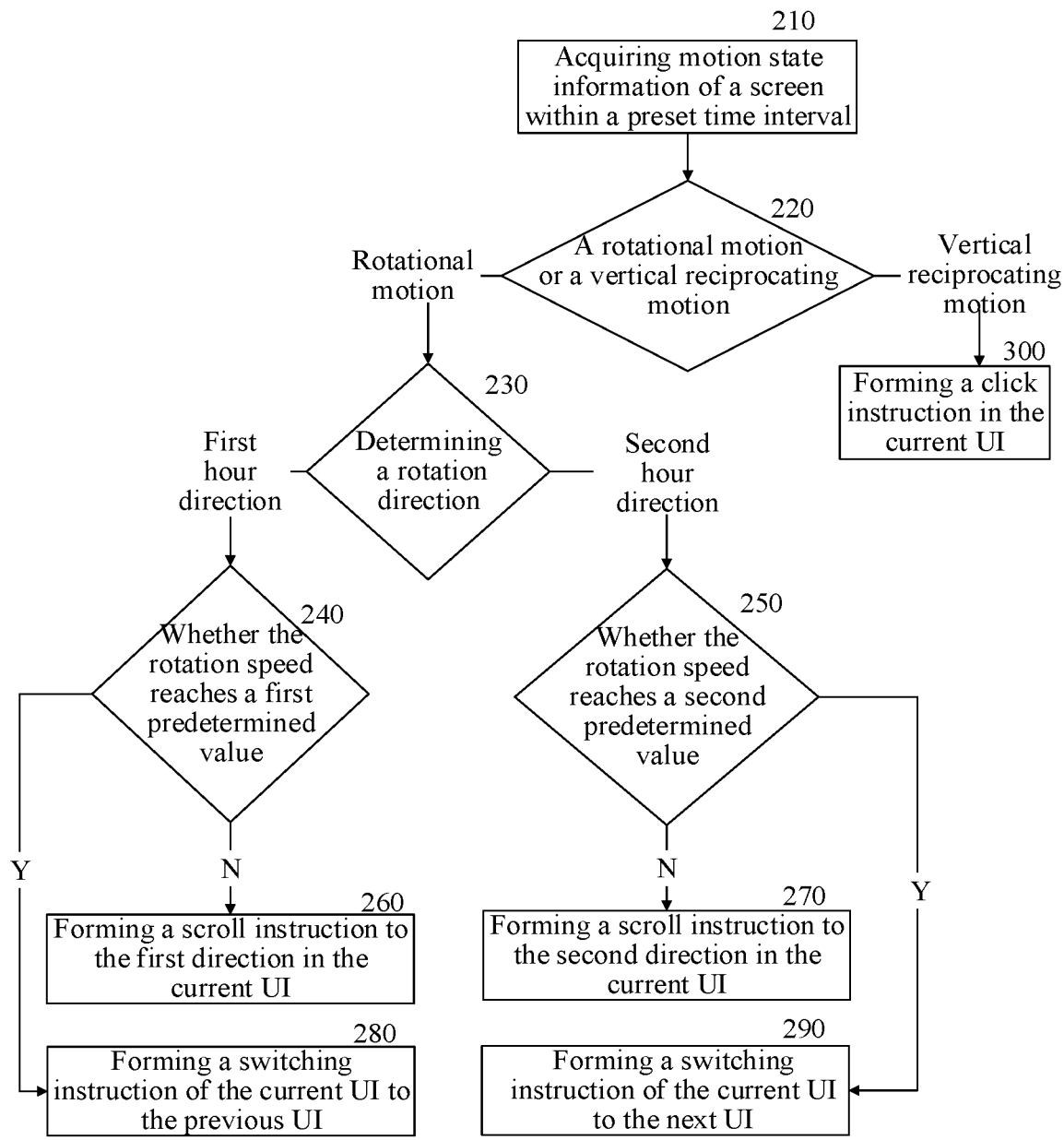
FIG. 3 is a flow chart of forming an operating instruction in a control instruction input method according to an exemplary embodiment of the present application.

FIG. 3 is a flow chart of forming an operating instruction in a control instruction input method according to an exemplary embodiment of the present application. As shown in FIG. 3, the step 200 includes:

Step 210: acquiring a motion state of a screen within a preset time interval;

Step 220: judging whether the motion state is a rotational motion or a vertical reciprocating motion;

Step 300: forming a click instruction in the current UI when the motion state is the vertical reciprocating motion (determining a click or double click according to the number of reciprocating times and reciprocating frequency);

Step 230: further determining a rotation direction when the motion state is the rotational motion;

Step 240: further determining whether the rotation speed reaches a first predetermined value, when the rotation direction is a first rotation direction;

Step 260: forming a scroll instruction to the first direction in the current UI, when the rotation speed does not reach the first predetermined value;

Step 280: forming a switching instruction of the current UI to the previous UI, when the rotation speed reaches the first predetermined value;

Step 250: further determining whether the rotation speed reaches a second predetermined value, when the rotation direction is a second rotation direction;

Step 270: forming a scroll instruction to the second direction in the current UI, when the rotation speed does not reach the second predetermined value;

Step 290: forming a switching instruction of the current UI to the next UI, when the rotation speed reaches the second predetermined value.

In the control instruction input method according to the embodiment of the present application, the trend quantitative data is used as a judgment element to connect the main motion state of the screen with the standard input instructions. Thereby, a new control instruction input process is formed.

In the embodiment of the present application, the rotation direction and a scroll direction of determining a motion reference point may be set as:

the first rotation direction—counterclockwise rotation, the first direction—page up;

the second rotation direction—clockwise rotation, the second direction—page roll down.

In at least one exemplary embodiment of the present application, the quantizated main motion states of the screen may also be directly mapped to the standard input instructions. Thereby, a control instruction input process including at least the correspondence shown in the following table 1 is formed.

TABLE 1

| Motion state | Touch standard instruction |
| --- | --- |
| Forward smooth rotation | Scrolling the UI or a focus content in the UI in the forward direction |
| Forward acceleration rotation | Switching to the previous UI or scanning the UI in the forward direction |
| Reverse smooth rotation | Scrolling the UI or the focus content in the UI in the reverse direction |
| Reverse acceleration rotation | Switching to the next UI or scanning the UI in the reverse direction |
| Forward smooth rotation | Moving a focus in the forward direction |
| Reverse smooth rotation | Moving the focus in the reverse direction |
| Fast drop-return | Single click |
| Fast repeat fast drop-return | Double clicks or consecutive clicks |

In the control instruction input method according to the embodiment of the present application, rich mapping schemes about the standard input instructions may be formed, and thus the composite standard input instructions may be input fast.

Figure 4:
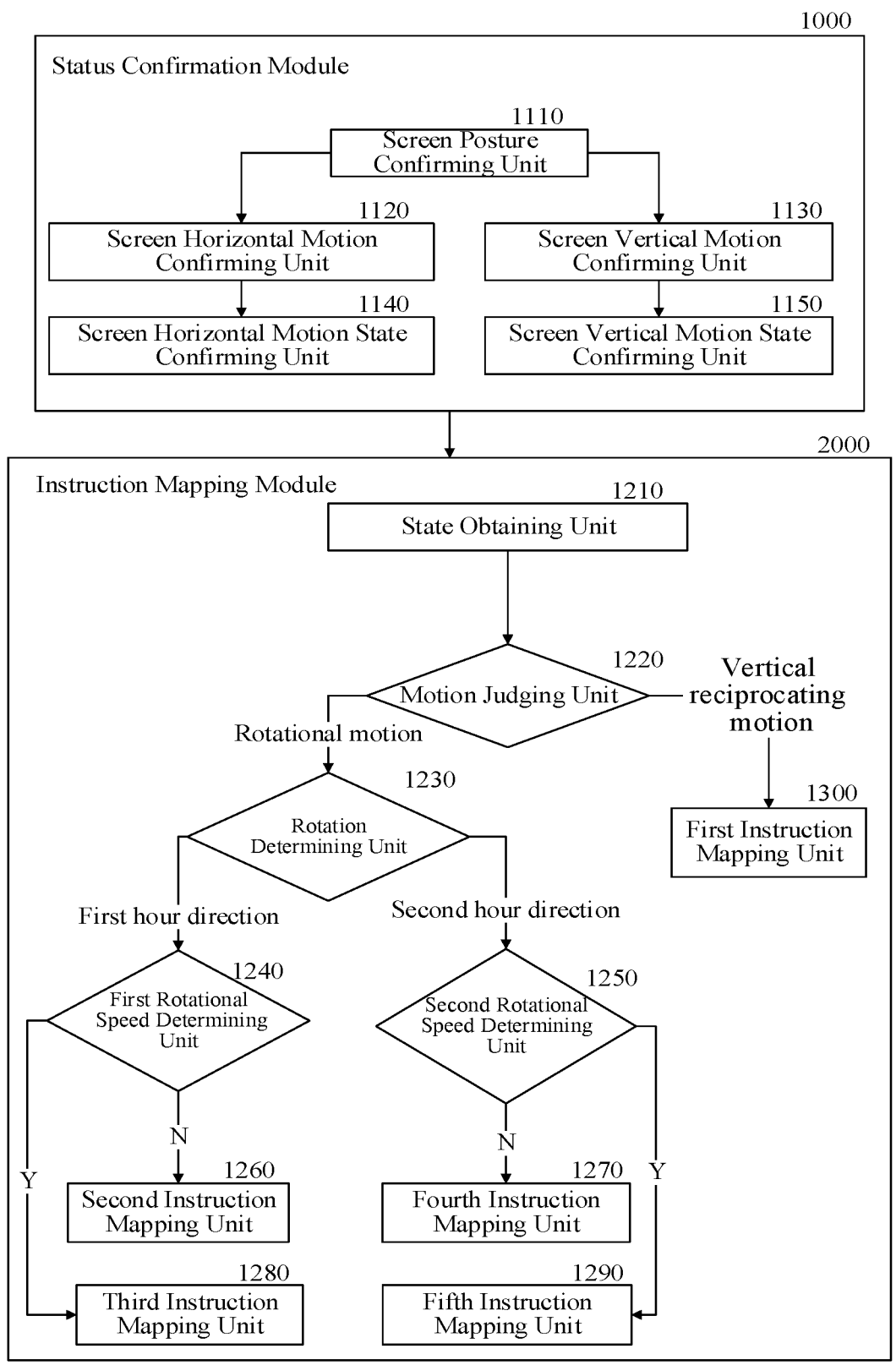
FIG. 4 is a schematic structural diagram of a control instruction input device according to an exemplary embodiment of the present application.

FIG. 4 is a schematic structural diagram of a control instruction input device according to an exemplary embodiment of the present application. As shown in FIG. 4, the control instruction input device includes: a status confirmation module 1000 configured to form motion state information of a screen according to a limb movement, an instruction mapping module 2000 configured to form an operating instruction of a UI in the screen according to the motion state information.

The status confirmation module 1000 shown in FIG. 4 includes: a screen posture confirming unit 1110 configured to acquire a motion posture of the screen according to a sensor signal, a screen horizontal motion confirming unit 1120 configured to acquire a time interval and real-time horizontal rotation data of the screen in stable posture according to the rotation data of the screen, a screen horizontal motion state confirming unit 1140 configured to determine the horizontal rotation state of the screen in the stable posture according to the time interval and the horizontal rotation data, a screen vertical motion confirming unit 1130 configured to acquire the time interval and real-time vertical movement data in the time interval according to the rotation data of the screen when the screen is in the stable posture, a screen vertical motion state confirming unit 1150 configured to determine a vertical movement state of the screen in the stable posture according to the time interval and the vertical movement data.

The instruction mapping module 2000 shown in FIG. 4 includes: a state obtaining unit 1210 configured to obtain a motion state of a screen within a preset time interval, a motion judging unit 1220 configured to judge whether the motion state is a rotational motion or a reciprocating motion, a first instruction mapping unit 1300 configured to form a click instruction in the current UI when the motion state is the vertical reciprocating motion, a rotation determining unit 1230 configured to further determine a rotation direction when the motion state is the rotational motion, a first rotational speed determining unit 1240 configured to further determine whether the rotation speed reaches a first predetermined value, when the rotation direction is a first rotation direction, a second instruction mapping unit 1260 configured to form a scroll instruction to the first direction in the current UI, when the rotation speed does not reach the first predetermined value, a third instruction mapping unit 1280 configured to form a switching instruction of the current UI to the previous UI, when the rotation speed reaches the first predetermined value, a second rotational speed determining unit 1250 configured to further determine whether the rotation speed reaches a second predetermined value, when the rotation direction is a second rotation direction, a fourth instruction mapping unit 1270 configured to form a scroll instruction to the second direction in the current UI, when the rotation speed does not reach the second predetermined value, a fifth instruction mapping unit 1290 configured to form a switching instruction of the current UI to the next UI, when the rotation speed reaches the second predetermined value.

A control instruction input device according to an exemplary embodiment of the present application includes: a memory configured to store a program code corresponding to a processing procedure of one of the above-described control instruction input methods, a processor configured to execute the program code.

The elements and algorithm steps described in the embodiments of the present application may be implemented in one or a combination of a computer software and an electronic hardware. Whether these functions are performed in the hardware or the software, depends on the specific application and design constraints of the technical solution. Different methods may be applied to implement the described functions for each particular application.

For the convenience and brevity of the description, the specific working processes of the system, the device and the unit described above may refer to the corresponding process in the foregoing method embodiment, and details are not described herein again.

In the several embodiments of the present application, it may be understood that the disclosed systems, the devices, and the methods may be implemented in other manners. For example, the device embodiments described above are merely illustrative. For example, the division of the units is only the division of logical functions. In an actual implementation, there may be another division manner. For example, multiple units or components may be combined or integrated into another system, or some features may be ignored or not executed. In addition, the coupling or direct coupling or communication connection shown or discussed herein may be an indirect coupling or communication connection through some interfaces, devices or units, and may be electrical, mechanical or otherwise.

The units described as separate components may or may not be physically separated. The components displayed as units may or may not be physical units, that is, the units may be located in a place, or may be distributed to multiple network units. According to actual needs, some or all of the units may be selected to achieve the solutions of the embodiments.

In addition, all functional units in each embodiment of the present application may be integrated into a processing unit, or each unit may exist physically separately, or two or more units may be integrated into a unit.

The functions may be stored in a computer readable storage medium if implemented in the form of a software functional unit and sold or used as a standalone product. Based on such understanding, the technical solution of the present application or the part contributing to the prior art or the part of the technical solution, may be embodied in the form of a software product stored in a storage medium. The software product includes several instructions. The instructions are used to cause a computer device (which may be a personal computer, server, or network device, etc.) to perform all or part of the steps of the methods described in various embodiments of the present application. The foregoing storage medium includes a medium which can store a program check code, such as a U disk, a mobile hard disk, a Read-Only Memory (ROM), a Random Access Memory (RAM), a magnetic disk or an optical disk and the like.

The above embodiments are only the preferred embodiments of the present application, and are not intended to limit the scope of the present application. Any modification, equivalent substitution, improvement, etc. made within the spirit and principles of this application are intended to be included within the scope of the present application.

What is claimed is:

1. A control instruction input method for a smart wearable device, comprising:
    forming motion state information of a screen of the smart wearable device according to a limb movement of a user wearing the smart wearable device, wherein the limb movement is detected by the smart wearable device;
    forming an operating instruction of a UI in the screen according to the motion state information; and
    executing the operating instruction to operate the UI,
    wherein forming an operating instruction of a UI in the screen according to the motion state information comprises:
        obtaining the motion state information of the screen within a preset time interval;
        judging whether the screen is in a rotational motion or a reciprocating motion according to the motion state information;
        determining a rotation direction and a rotation speed of the rotational motion if the screen is in a rotational motion;
        determining whether the rotation speed reaches a first predetermined value when the rotation direction is a first rotation direction;
        forming an instruction of scrolling in the first rotation direction in the current UI when the rotation speed does not reach the first predetermined value; and
        forming an instruction of switching from the current UI to a previous UI when the rotation speed reaches the first predetermined value; and
    wherein the forming motion state information of a screen according to a limb movement comprises:
        obtaining real-time rotation data of the screen by filtering real-time data of a motion posture of the screen, and acquiring a time interval and rotation data of the screen in a stable posture according to the real-time rotation data of the screen.

2. The control instruction input method according to claim 1, wherein the forming motion state information of a screen according to a limb movement further comprises:
    acquiring the real-time data of the motion posture of the screen according to a sensor signal; and
    determining a rotation state of the screen in the stable posture according to the time interval and the rotation data in the stable posture.

3. The control instruction input method according to claim 1, wherein the motion state comprises one or a combination of a forward smooth rotation, a forward acceleration rotation, a reverse smooth rotation and a reverse acceleration rotation.

4. The control instruction input method according to claim 3, wherein the forming an operating instruction of a UI in the screen according to the motion state information comprises:
    forming a mapping instruction of the forward smooth rotation comprising one of scrolling the UI in a forward direction, scrolling a focus content in the UI in the forward direction and moving a focus in the UI in the forward direction.

5. The control instruction input method according to claim 4, wherein a mapping instruction of the forward acceleration rotation comprises either of switching to a previous UI and scanning the UI in a forward direction.

6. The control instruction input method according to claim 4, wherein a mapping instruction of the reverse smooth rotation comprises one of scrolling the UI in a reverse direction, scrolling a focus content in the UI in the reverse direction and moving a focus in the UI in the reverse direction.

7. The control instruction input method according to claim 4, wherein a mapping instruction of the reverse acceleration rotation comprises either of switching to a next UI and scanning the UI in a reverse direction.

8. The control instruction input method according to claim 1, wherein the forming an operating instruction of the rotational motion of the UI, when a motion characteristic of the screen is the rotational motion further comprises:
    determining whether the rotation speed reaches a second predetermined value, when the rotation direction is a second rotation direction;
    forming a scroll instruction to a second direction in the current UI, when the rotation speed does not reach the second predetermined value; and
    forming a switching instruction of the current UI to a next UI, when the rotation speed reaches the second predetermined value.

9. The control instruction input method according to claim 1, wherein the forming motion state information of a screen according to a limb movement comprises:
    acquiring motion posture information of the screen according to a sensor signal;
    acquiring the time interval and real-time movement data in the time interval according to the rotation data of the screen when the screen is in the stable posture; and
    determining a movement state of the screen in the stable posture according to the time interval and the real-time movement data.

10. The control instruction input method according to claim 1, wherein the motion state comprises at least one of a fast drop-return and a fast repeat fast drop-return; and
    the forming an operating instruction of a UI in the screen according to the motion state information comprises:
        forming a mapping instruction of the fast drop-return comprising single click; and
        forming a mapping instruction of the fast repeat fast drop-return comprising either of double clicks and consecutive clicks.

11. The control instruction input method according to claim 1, wherein the forming an operating instruction of a UI in the screen according to the motion state information comprises:
  obtaining motion state information of the screen within a time interval;
  judging whether the motion state is a rotational motion or a reciprocating motion; and
  forming a click instruction in the current UI when the motion state is the reciprocating motion.

12. The control instruction input method according to claim 1, wherein one of a limb, an elbow and a waist loading the screen acts as a reference point of the motion state in the limb movement.

13. A control instruction input device, comprising:
  a memory, configured to store a program code corresponding to a processing procedure of the control instruction input method according to claim 1; and
  a processor, configured to execute the program code.

14. A control instruction input device for use in a smart wearable device, comprising:
  a status confirmation module, configured to form motion state information of a screen of the smart wearable device according to a limb movement of a user wearing the smart wearable device; and
  an instruction mapping module, configured to form an operating instruction of a UI in the screen according to the motion state information,
  wherein the operating instruction is executed to operate the UI;
  wherein the instruction mapping module configured to form an operating instruction of a UI in the screen according to the motion state information by:
    obtaining the motion state information of the screen within a preset time interval;
    judging whether the screen is in a rotational motion or a reciprocating motion according to the motion state information;
    determining a rotation direction and a rotation speed of the rotational motion if the screen is in a rotational motion;
    determining whether the rotation speed reaches a first predetermined value when the rotation direction is a first rotation direction;
    forming an instruction of scrolling in the first rotation direction in the current UI when the rotation speed does not reach the first predetermined value; and
    forming an instruction of switching from the current UI to a previous UI when the rotation speed reaches the first predetermined value; and
  wherein the status confirmation module is configured to form motion state information of a screen according to a limb movement by:
    obtaining rotation data of the screen in a motion posture by filtering real-time data of a motion posture of the screen, and acquiring a time interval and rotation data of the screen in a stable posture according to the rotation data of the screen in a motion posture.

* * * * *